United States Patent [19]

Borck et al.

[11] 3,839,336
[45] Oct. 1, 1974

[54] N-ACYL-(PIPERAZINOALKYL)-PYRAZOLES

[75] Inventors: Joachim Borck; Volker Koppe; Helmut Muller-Calgan; Eike Poetsch; Karl Schulte, all of Darmstadt, Germany

[73] Assignee: Merck Patent Gesellschaft mit beschrankter Haftung, Darmstadt, Germany

[22] Filed: Mar. 3, 1972

[21] Appl. No.: 231,750

[30] Foreign Application Priority Data
Mar. 5, 1971 Germany............... 2110568

[52] U.S. Cl......... 260/268 PH, 260/240 K, 424/250
[51] Int. Cl............................................. C07d 51/70
[58] Field of Search....... 260/268 PH, 268 H, 310 R

[56] References Cited
UNITED STATES PATENTS

| | | | |
|---|---|---|---|
| 3,224,217 | 2/1960 | Schmidt | 260/208 H |
| 3,308,130 | 3/1962 | Bousquet | 260/310 R |
| 3,367,936 | 2/1968 | Koppe et al. | 260/268 H |
| 3,428,032 | 11/1969 | Arya | 260/268 PH |
| 3,470,184 | 9/1969 | Arya et al. | 260/268 PH |
| 3,491,097 | 1/1970 | Koppe et al. | 260/268 PH |
| 3,649,631 | 3/1972 | Koppe | 260/268 H |

Primary Examiner—Donald G. Daus
Attorney, Agent, or Firm—Millen, Raptes & White

[57] ABSTRACT

N-acyl-pyrazoles of the formula

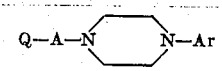

wherein A is alkylene of one to four carbon atoms; Ar is phenyl, unsubstituted or substituted by one or more of alkyl and alkoxy of one to four carbon atoms, trifluoromethyl and halogen, and Q is

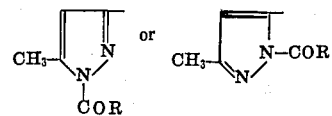

R being saturated or unsaturated alkyl or aralkyl of up to 10 carbon atoms, aryl of up to 10 carbon atoms, unsubstituted or substituted by one or more of alkyl, of 1–4 carbon atoms, amino and methoxy, —NH$_2$, —N(CH$_3$)$_2$ or alkoxy of 1–4 carbon atoms, and the physiologically acceptable salts thereof, possess valuable pharmacological properties, especially CNS-depressive activity, e.g., one or more of narcosis-prolonging, tranquilizing and neuroleptic properties.

17 Claims, No Drawings

N-ACYL-(PIPERAZINOALKYL)-PYRAZOLES

BACKGROUND OF THE INVENTION

This invention relates to novel piperazinoalkyl-pyrazoles and a process for the preparation thereof. N-alkyl-(N'-aryl-piperazinoalkyl)-pyrazoles are described in U.S. Pat. No. 3,367,936. N-(3-pyrazolyl-propyl)-n'-phenylpiperazines are described in U.S. Pat. No. 3,470,184. N-unsubstituted compounds otherwise corresponding to the compounds of this invention are described in U.S. Pat. No. 3,491,097.

SUMMARY OF THE INVENTION

The novel compounds of this invention are N-acyl-(piperazinoalkyl)-pyrazoles of the Formula I

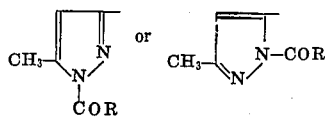
I wherein A is branched or straight chain alkylene of one to four carbon atoms, Ar is phenyl, unsubstituted or substituted by one or more of alkyl and alkoxy, each of one to four carbon atoms, trifluoromethyl and halogen, Q is

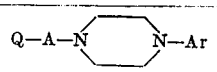

and R is saturated or unsaturated alkyl or aralkyl, each of up to 10 carbon atoms, aryl of up to 10 carbon atoms, unsubstituted or substituted by one or more of alkyl of one to four carbon atoms, amino and methoxy, $-NH_2$, $-N(CH_3)_2$ or alkoxy of up to four carbon atoms, and the physiologically acceptable acid addition salts thereof, and mixtures thereof. These compounds possess valuable pharmacological properties with good compatibility, including CNS-depressive activity, e.g., one or more of narcosis-prolonging, narcosis-potentiating, tranquilizing and neuroleptic activity. Other properties are blood pressure lowering, noradrenaline-potentiating or adrenaline-potentiating, stimulating, e.g., thymoanaleptic and tetrabenazine-antagonistic, and antihistaminic and bronchospasmolytic properties. Accordingly, the novel compounds of this invention can be employed as drugs. They are also useful as intermediates for the preparation of other drugs.

The compounds of Formula I and the physiologically acceptable salts thereof can be produced by the following processes:

a. a compound of Formula II

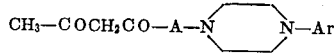
II is reacted with a compound of the formula RCO-NHNH$_2$ (III);

b. a compound of Formula IV

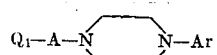
IV wherein $Q_1$ is

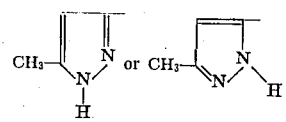

is reacted with an acid of the formula RCOOH (V); or a functional derivative thereof;

c. a compound of the formula Q - A - X (VI) wherein X is an optionally reactively esterified OH-group, is reacted with a compound of Formula VII

VII and/or a compound of Formula I is converted into a physiologically acceptable salt thereof by treatment with an acid and/or liberated from an acid addition salt thereof by treatment with a base.

In Formulae II through VII, A, Ar, Q, $Q_1$, R, and X each have the values given above.

Of the compounds of Formula I, preferred are wherein A is straight chain alkylene of one to four carbon atoms. A thus preferably is $-(CH_2)_n-$, e.g., $-CH_2-$, $-CH_2CH_2-$, $-CH_2CH_2CH_2-$ or $-CH_2CH_2CH_2CH_2-$. However, A can also be, e.g., $-CH(CH_3)-$, $-CH(CH_3)CH_2-$, $-CH_2CH(CH_3)-$, $-CH(C_2H_5)-$, $-CH(CH_3)CH_2CH_2-$, $-CH_2CH(CH_3)CH_2-$, $-CH_2CH_2CH(CH_3)-$, $-CH(C_2H_5)CH_2-$, $-CH_2CH(C_2H_5)-$, $-CH(n-C_3H_7)-$ or $-CH(iso-C_3H_7)-$, $-CH(CH_3)-CH(CH_3)-$, $-C(CH_3)_2-CH_2-$ or $-CH_2-C(CH_3)_2-$.

Ar in each instance preferably is unsubstituted phenyl or phenyl mono-, di- or tri- substituted by one or more of alkyl of one to four carbon atoms, e.g., methyl, ethyl and isopropyl, alkoxy or one to four, carbon atoms, e.g., methoxy, ethoxy, trifluoromethyl or halo, e.g., phenyl, o-, m-, and p- tolyl, 2,4-dimethylphenyl, o-, m-, and p-ethylphenyl, p-isopropylphenyl, 2-methyl-5-isopropylphenyl, o-, m- and p-methoxyphenyl, 3,4-dimethoxyphenyl, 3,4,5-trimethoxyphenyl, 2-methoxy-5-methylphenyl, o-, m- and p-ethoxyphenyl, o-, m-and p-trifluoromethylphenyl, o-, m- and p-fluorophenyl, o-, m- and p-chlorophenyl, 2,3-, 2,4-, 2,5-, 2,6-, 3,4- and 3,5- dichlorophenyl, 2,4,6-trichlorophenyl, o-, m- and p-bromophenyl, 2,4-dibromophenyl, o-, m- and p-iodophenyl.

R, when optionally unsaturated alkyl, preferably is n-alkyl of one to 10 carbon atoms, e.g., methyl, ethyl, n-propyl, n-butyl, n-pentyl, n-hexyl, n-heptyl, n-octyl, n-nonyl and n-decyl. R can also be, e.g., isopropyl, isobutyl, sec.-butyl, tert,-butyl, isoamyl, isohexyl, ethenyl and ethinyl; when R is optionally unsaturated aralkyl of up to 10 carbon atoms, R can be, e.g., benzyl, α- and β-phenethyl, 3-phenyl-1-propyl, 2-phenyl-1-propyl, 1-phenyl-1-propyl, 4-phenyl-1-butyl, styryl and phenylethinyl. Examples of R when aryl optionally mono- or polysubstituted by alkyl, amino, or methoxy groups, are phenyl, naphthyl, o-, m- and p-tolyl, 2,4-dimethylphenyl, o-, m- and p-ethylphenyl, p-isopropylphenyl, 2-methyl-5-isopropylphenyl, o-, m- and p-methoxyphenyl, 3,4-dimethoxyphenyl, 3,4,5- trimethoxyphenyl, 2-methoxy-5-methylphenyl, p-aminophenyl, or p-dimethylaminophenyl. When R is alkoxy of up to four carbon atoms e.g., methoxy, ethoxy, n-propoxy, isopropoxy, n-butoxy, isobutoxy, sec.-butoxy, or tert,-butoxy, the compound is a carbalkoxy substituted pyrazole. When R is $-NH_2$ or $-N(CH_3)_2$, the resulting compound is an amido substituted pyrazole.

In the definition of X, the term reactively esterified OH-groups means an ester which can be substituted by amino-nitrogen when reacted with an amine, preferably, acyloxy, e.g., acetoxy, or other alkanoyloxy of one to four carbon atoms, methanesulfonyloxy or other alkanesulfonoxy of one to four carbon atoms, p-toluenesulfonyloxy or other arylsulfonyloxy of six to 10 carbon atoms, and mineral acid esters, e.g., Cl, Br, or I.

As stated above, certain type of compounds of Formula I are preferred, e.g., those wherein:

a. A is straight chain alkylene, especially ethylene;
b. Ar is phenyl, preferably mono-substituted phenyl, more preferably those wherein the substituent is halo, preferably Cl, or alkyl of one to four carbon atoms, preferably $CH_3$, especially those of (a) above;
c. R is straight-chain alkyl, dialkylamine, preferably dimethylamino, alkoxy, preferably ethoxy, phenyl, preferably amino- or alkoxy-substituted phenyl, preferably methoxy-substituted phenyl, or styryl, alkoxy in each instance containing one to four carbon atoms, especially those of (a) and (b) above.

Starting compounds of Formula II are preferably 1-(N'-arylpiperazino)-2,4-pentanediones wherein aryl has the values given above, and the corresponding -3,5-hexanediones, -4,6-heptanediones and -5,7-octanediones.

The starting compounds of Formula II can be obtained, for example, by reacting a 1,3-dicarbonyl compound halogenated in the terminal position, e.g., 1-bromo- or 1-chloro-pentanedione-(2,4), with an arylpiperazine of Formula VII.

Examples of starting compounds of Formula III are aliphatic, araliphatic and aromatic acylhydazines, e.g., acetyl-, propinyl-, butyryl-, isobutyryl-, valeryol-, isovaleryl-, hexanoyl-, heptanoyl-, octanoyl, nonanoyl-, acryloyl-, propioloyl-, phenylacetyl-, cinnamoyl-, benzoyl-, naphthoyl-, o-, m-, and p-toluoyl, 3,4,5-trimethoxybenzoyl-, p-aminobenzoyl- and p-dimethylaminobenzoylhydrazine. It is also possible, for example, to employ functionally modified carbonic acid hydrazides, e.g., semi-carbazide.

The acylhydrazines of Formula III are obtained, for example, from the corresponding carboxylic acid esters and hydrazine hydrate.

The starting compounds of Formula IV are preferably 3(5)-[(N'-arylpiperazino)-ethyl]-5(3)-methylpyrazoles, wherein Ar has the values given above, e.g., m-chlorophenyl and m-tolyl. The corresponding -methyl]-5(3)-methyl-, propyl]-5(3)-methyl-, and -butyl]-5(3)-methylpyrazoles wherein the alkyl groups are branched or straight chains can also be employed.

Compounds of Formula IV are known or can be produced, for example, by reacting a pyrazole of the formula $Q_1$-A-X With a piperazine of the Formula VII or by other conventional methods.

Examples of acids of Formula V are aliphatic carboxylic acids of one to 11 carbon atoms, carbonic acid, ar-aliphatic carboxylic acids of up to 11 carbon atoms, and unsubstituted or optionally substituted aromatic carboxylic acids of up to 11 carbon atoms. Functional derivatives of these carboxylic acids are preferably the halogenides thereof, preferably acid bromides and acid chlorides, esters thereof, preferably of alkanols of one to four carbon atoms, anhydrides, including mixed anhydrides of carboxylic acids and carbonic acid monoesters, ketenes, and carbonic acid derivatives, of which chloroformic acid esters are particularly suitable.

As the starting compounds of Formula VI, especially suitable are the 1-acyl-5-methyl derivatives of 3-chloromethyl-, 3-(1-chloroethyl)-, 3-(2-chloroethyl)-, 3-(3-chloropropyl)-, or 3-(4-chlorobutyl)-pyrazole, and/or the 1-acyl-3-methyl derivatives of 5-chloromethyl-, 5-(1-chloroethyl)-, 5-(2-chloroethyl)-, 5-(3-chloropropyl)- and 5-(4-chlorobutyl)-pyrazole, as well as the corresponding 3-bromoalkyl, 3-iodoalkyl, 5-bromoalkyl and 5-iodoalkyl compounds, and the esters of the corresponding 1-acyl-5-methyl-3-hydroxyalkyl- and/or 1-acyl-3-methyl-5-hydroxyalkyl-pyrazoles, in particular the methane- and p-toluenesulfonates thereof.

Compounds of Formula VI are known or can be easily prepared analogously to known compounds. For example, 5-methylpyrazole-3-carboxylic acid esters can be reduced catalytically or with lithium aluminum hydride to 3-hydroxymethyl-5methylpyrazole. 2-Hydroxy-5-methyl-4-pyrone can be converted with hydrazine to 5-methyl-pyrazole-3-acetic acid hydrazide, from which the corresponding esters can be obtained by alcoholysis. By the reduction of these esters, 3-(2-hydroxyethyl)-5-methylpyrazole can be obtained. 3-(3-Hyclroxprobl)- and/or 3-(4-hydroxybutyl)-5-methylpyrazoles (VI, X = OH, A = $C_3H_6$ or $C_4H_8$) can be produced by condensing carbonyl compounds R—CO—$CH_3$ with γ-butyrolactone or δ-valerolactone, respectively, to 2-hydroxy-2-acylmethyltetrahydrofurans and -pyrans and subsequent reaction with hydrazine. The corresponding halogen compounds (VI, X = Cl, Br or I) are obtained from the thus-produced alcohols with, for example, thionyl chloride, hydrobromic acid, or hydriodic acid. The corresponding acylates and sulfonic acid esters are obtained by customary esterification, for example with an acid anhydride or halogenide, e.g., acetic anhydride, methane- and p-toluenesulfonyl chloride. By the acylation of the thus-obtained products, the starting compounds of Formula VI are produced.

Of the compounds of Formula VII, the following piperazines are preferred: N-Phenyl-, N-o-tolyl-, N-m-tolyl-, N-p-tolyl, N-p-ethylphenyl-, N-o-methoxyphenyl-, N-p-methoxyphenyl-, N-p-methoxyphenyl-, N-o-trifluoromethylphenyl-, N-m-trifluoromethyphenyl-, N-p-trifluoromethylphenyl-, N-o-fluorophenyl-, N-m-fluorophenyl-, N-p-fluorophenyl-, N-o-chlorophenyl-, N-m-chlorophenyl-, N-p-chlorophenyl-, N-o-bromophenyl-, N-m-bromophenyl-, N-p-bromophenyl-, N-o-iodophenyl-, N-m-iodophenyl- and N-p-iodophenylpiperazine.

The piperazines of Formula VII are known or can be obtained by reacting amines of the formula $ArNH_2$ with diethanolamine, morpholine, or bis(2-chloroethyl) amine, or by the reaction of piperazine with a halogenide of the formula ArX wherein X is preferably is Br.

Examples of other compounds of Formula I in addition to those named hereinafter are:

1-acetyl-3(5)-[(N'-o-chlorophenylpiperazino)-methyl]-5(3)-methylpyrazole,
1-acetyl-3(5)2-(N'-o-chlorophenylpiperazino)-ethyl]-5(3)-methylpyrazole,
1-acetyl-3(5)-[3-(N'-o-chlorophenylpiperazino)-propyl]-5(3)-methylpyrazole,
1-acetyl-3(5)-[4-(N'-o-chlorophenylpiperazino)-butyl]-5(3)-methylpyrazole,
1-butyryl-3(5)-[(N'-m-chlorophenylpiperazino)-methyl]-5(3)-methylpyrazole,
1-butyryl-3(5)-[3-(N'-m-chlorophenylpiperazino)-propyl]-5(3)-methylpyrazole,
1-butyryl-3(5)-[4-(N'-m-chlorophenylpiperazino)-butyl]-5(3)-methylpyrazole,
1-butyryl-3(5)-[(N'-m-tolylpiperazino)-methyl]-5(3)-methylpyrazole,
1-butyryl-3(5)-[3-(N'-m-tolylpiperazino)-propyl]-5(3)-methylpyrazole,
1-butyryl-3(5)-[4-(N'-m-tolylpiperazino)-butyl]-5(3)-methylpyrazole, In the description which follows, the term "ordinary solvent" means an inert solvent suitable for that reaction, e.g., water; a hydrocarbon, e.g., heptane, cyclohexane, benzene and toluene; a halogenated hydrocarbon, e.g., chloroform, ethylene chloride, hexachlorobutadiene and chlorobenzene; an alcohol, e.g., methanol, ethanol, ethylene glycol monoethyl ether, and tert.-butyl alcohol; an ether, e.g., diethyl ether, ethylene glycol dimethyl ether, tetrahydrofuran and dioxane; a ketone, e.g., acetone, butanone and acetophenone; an ester, e.g., ethyl acetate; an aprotic-dipolar solvent, e.g., dimethylformamide, acetonitrile, dimethyl sulfoxide, tetramethylurea, tetrahydrothiophene 1,1-dioxide propylene carbonate and hexamethylphosphoric triamide; or a mixture of these solvents. The terms "basic catalysts" and "acid-neutralizing agents" in the following description, mean bases or basic salts, preferably hydroxides, e.g., NaOH, KOH, Ca(OH)$_2$, or Ba(OH)$_2$; carbonates, such as Na$_2$CO$_3$, KHCO$_3$, CaCO$_3$; acetates, such as sodium acetate; or organic bases, such as triethylamine, dimethylaniline, pyridine and quinoline.

The reaction of a compound II with a compound III is preferably effected in an ordinary solvent.

It is also possible to conduct the reaction in the presence of a catalyst, preferably an acidic catalyst, e.g., mineral acids, including HCl and H$_2$SO$_4$, Lewis acids, e.g., BF$_3$ and AlCl$_3$ and organic acids, e.g., p-toluenesulfonic acid, acetic acid and trifluoroacetic acid. The reaction temperature can range between −10° C. and 120° C., preferably between 0° and 100° C., preferably the boiling temperature of the solvent employed.

The acylation of a compound of Formula IV with an acid of Formula V or preferably a functional derivative thereof to obtain a compound of Formula I is accomplished in accordance with the methods described in the literature under a great variety of reaction conditions, which conditions vary with the acylating agent employed. If an acyl halogenide, preferably an acyl chloride or bromide, is employed, the reaction advantageously is conducted in solution and/or suspension. One of the ordinary solvents, inert with respect to acylating agents, is used, in most cases in the presence of a basic catalyst. The reaction temperature can range between −20° C. and +100° C., preferably between −5° C. and +40° C. It is especially advantageous to operate under anhydrous conditions and to add, for example, the acyl halogenide at 0° C. to an anhydrous solution of the pyrazole in pyridine, in a dropwise manner. The reaction times vary between 1 hour and 4 days.

If an acid anhydride is used as the acylating agent, it is possible in most cases to conduct the reaction under the above-described reaction conditions. However, it is also possible, for example, to acylate a hydrochloride of the pyrazole employed with the acid anhydride after adding the stoichiometric amount of sodium acetate, in an aqueous solution or suspension at e,g., 40°–60° C. When an excess of the acid anhydride is used as the solvent, the reaction is often accelerated by adding a small amount of concentrated H$_2$SO$_4$.

The acylation can also be effected with esters, preferably methyl esters, of acids of Formula V. An excess of the ester is employed, optionally with the addition of one of the ordinary solvents. The reaction temperature preferably is between −20° C. and 100° C.

If a ketene is used as the acylating agent, it is likewise possible to conduct the reaction under the abovedescribed conditions. For example, the ketene can be added dropwise under ice cooling to an aqueous suspension of the pyrazole. However, it is more advantageous to acylate in an organic solvent at an elevated temperature, e.g., by adding the ketene dropwise to a boiling solution of the pyrazole in ethylene chloride.

The reactions of the compounds of Formulae VI and VII are effected in accordance with methods known in the literature for the alkylation of amines. The reaction is conducted, for example, in one of the ordinary solvents, optionally with the addition of an acid-neutralizing agent or an excess of the compound of Formula VII. Depending on the conditions employed, the reaction times range between several minutes and 14 days. Sometimes, heating for 12-24 hours is necessary in order to attain satisfactory yields. The reaction temperature is between 0° and 200°C., ordinarily at 80°–130° C.

In some of the aforedescribed reactions, two position isomers can be produced which differ by the position of the double bonds and the N-acyl group in the pyrazole ring, which isomers are compounds of Formula Ia and Ib, respectively:

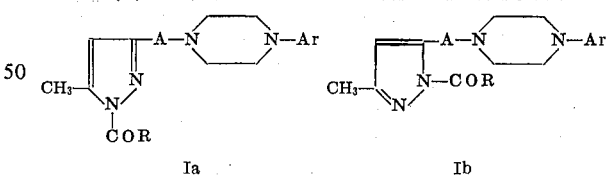

Ia      Ib

The formation of a mixture of these isomers, which like the pure isomers, are part of the subject matter of the present invention, is to be expected. In particular, such a mixture can be produced in the reaction of a compound of Formula II with a compound of Formula III and in acylation of a pyrazole of Formula IV with an acid of Formula V, or one of the functional derivatives thereof. If the compounds of Formula I are obtained by reacting compounds of Formula VI with compounds of Formula VII, mixtures of isomers can also be expected insofar as the starting compounds of Formula VI already are in the form of such a mixture.

The pure isomers of Formula Ia or Ib, respectively, can also be converted into each other by heating, wherein the isomer which is thermodynamically more stable, or mixtures of the isomers can be obtained. Conversely, it is also possible by heating the mixture of isomers to produce a pure isomer, usually the one which is more stable thermodynamically.

Similarly, racemic mixtures can be produced which can be converted by conventional means into single racemate pairs of optical isomers and, if desired, thereafter separated into a pure optical isomer.

Mixtures of compounds of Formulae Ia and Ib can be separated in a conventional manner on the basis of their different solubilities, optionally also by chromatographical methods.

The compounds of Formula I can be converted into their acid addition salts with an acid in the usual manner. For this reaction, those acids are suitable which yield physiologically acceptable salts. It is possible to employ organic and inorganic acids, such as, e.g., aliphatic, alicyclic, araliphatic, aromatic, or heterocyclic, mono- or polybasic carboxylic or sulfonic acids, such as formic acid, acetic acid, propionic acid, pivalic acid, diethylacetic acid, oxalic acid, malonic acid, lactic acid, succinic acid, pimelic acid, fumaric acid, maleic acid, tartaric acid, malic acid, aminocarboxylic acids, sulfamic acid, benzoic acid, salicylic acid, phenylpropionic acid, citric acid, gluconic acid, ascorbic acid, nucotinic acid, isonicotinic acid, methanesulfonic acid, ethane-disulfonic acid, β-hydroxyethanesulfonic acid, p-toluenesulfonic acid, naphthalene-, mono- and -disulfonic acids, sulfuric acid, nitric acid, hydrohalic acids, such as hydrochloric acid or hydrobromic acid, or phosphoric acids, such as orthophosphoric acid. Other acids can be employed to produce acid addition salts for isolation, characterization and/or purification purposes.

The novel compounds of this invention can be employed in mixture with conventional pharmaceutical excepients. Carrier substances can be such organic or inorganic substances suitable for parenteral, enteral, or topical application, and which, of course, do not deleteriously react with the novel compounds, such as, for example, water, vegetable oils, polyethylene glycols, glycerol, gelatin, lactose, amylose, corn starch, potato starch, magnesium stearate, talc, vaseline, cholesterol, etc.

For parenteral application, particularly suitable are solutions, preferably oily or aqueous solutions, as well as suspensions, emulsions, or implants, Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

The compounds of this invention are generally administered to mammals in a dosage of 2–100 mg per dosage unit in mixture with 1–5,000 mg of a solid, liquid or semi-liquid pharmaceutical carrier. The dosage per weight ratio is about 0.002 to 2 mg per kg of body weight, the dosage being increased or decreased according to the response of the mammal. Generally speaking, the compounds of this invention will be used in the same manner as known piperazines having CNS-depressant, e.g., tranquilizing activity.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees centigrade.

EXAMPLE 1

Under cooling, a solution of 2.5 g. of acetylhydrazine in a mixture of 20 ml. of ethanol and 1 ml. of concentrated HCl is poured into a solution of 10.1 g. of 6-(N'-m-chlorophenylpiperazino)-2,4-hexanedione (obtainable from 6-bromo-2,4-hexanedione and N-m-chlorophenylpiperazine) in 200 ml. of ethanol, then heated for 4 hours to 60°; the solvent is removed under vacuum, the residue is taken up in 100 ml. of 5% NaOH, extracted three times with 40 ml. of ether, the combined ether phases are dried with $MgSO_4$, the ether is removed under vacuum, and in this way 1-acetyl-3(5)-[2-(N'-m-chlorophenylpiperazino)-ethyl]-5(3)-methylpyrazole is obtained; maleate, m.p. 145°–147°.

EXAMPLE 2

Under ice cooling, 3.53 ml. of acetyl chloride is added to 9.12 g. of 3(5)-[2-(N'-m-chlorophenylpiperazino)-ethyl]-5(3)-methylpyrazole, dissolved in 100 ml. of absolute tetrahydrofuran and 4.75 ml. of anhydrous pyridine; the reaction mixture is agitated under the exclusion of water at room temperature for 2 days. The solvent is then distilled off, the residue is made alkaline with aqueous NaOH, extracted with ether, the ether phase dried over $Na_2SO_4$, and the solvent distilled off, thus producing 1-acetyl-3(5)-[2-(N'-m-chlorophenylpiperazino)-ethyl]-5(3)-methylpyrazole; maleate, m.p. 145°–147°.

EXAMPLE 3

5 g. of 3-[2-(N'-m-chlorophenylpiperazino)-ethyl]-5-methylpyrazole is dissolved in 50 ml. of dry tetrahydrofuran. To this reaction mixture is added 1.25 g. of NaH, and the mixture is then boiled for 1 hour under a nitrogen atmosphere. After cooling, 1.85 g. of N,N-dimethylcarbamoyl chloride is added thereto, the mixture refluxed for another hour, and then agitated for 2 days at room temperature. The reaction mixture is filtered, the filtrate concentrated by evaporation, taken up in ethanol, and precipitated with ethereal HCl. After recrystallization from ethanol/ether, 1-dimethylaminocarbonyl-3-[2-(N'-m-chlorophenylpiperazino)-ethyl]-5-methylpyrazole is obtained; hydrochloride, m.p. 198°–200°. After evaporating the mother liquor, 1-dimethylaminocarbonyl-5-[2-(N'-m-chlorophenylpiperazino)-ethyl]-3-methylpyrazole is produced; hydrochloride-monohydrate, m.p. 145°–147° (from isopropanol/ether).

EXAMPLE 4

14.2 g. of 3-[2-(N'-m-tolylpiperazino)-ethyl]-5-methylpyrazole is dissolved in a mixture of 120 ml. of absolute tetrahydrofuran and 1 ml. of concentrated $H_2SO_4$; during a period of 30 minutes, 10 ml. of butyric acid anhydride is added dropwise thereto, the mixture is stirred for 2 days at room temperature, poured into an excess of ice water, and aqueous NaOH is added under stirring until a pH of about 8 has been attained. The mixture is extracted with ether, the ether phase is dried, the solvent is distilled off, and 1-butyryl-3(5)-[2-(N'-m-tolylpiperazino)-ethyl]-5(3)-methylpyrazole is thus obtained; picrate, m.p. 200°–202°.

EXAMPLE 5

A mixture of 6.2 g. of 1-acetyl-3(5)-(2-chloroethyl)-5(3)-methylpyrazole [obtainable by reacting 3-(2-chloroethyl)-5-methylpyrazole with acetyl chloride], 6.5 g. of N-(m-chlorophenyl)-piperazine, 5 g. of anhydrous $K_2CO_3$, and 100 ml. of dry dimethyl-formamide is agitated for 24 hours at 100°–110°; filtered after cooling; the solvent is distilled off, the residue taken up in a small amount of ethanol, mixed with an excess of ethanolic maleic acid, allowed to stand for 2 hours at 0°, and the thus-separated crystals are vacuum-filtered, thus obtaining 1-acetyl-3(5)-[2-(N'-m-chlorophenylpiperazino)-ethyl]-5(3)-methylpyrazole maleate, m.p. 145°–147°.

EXAMPLE 6

A mixture of 9.7 g. of 1-p-aminobenzoyl-3(5)-(2-bromoethyl)-5(3)-methylpyrazole [obtainable by reacting 3-(2-bromoethyl)-5-methylpyrazole with benzoyl bromide] and 5.9 g. of N-(m-tolyl)-piperazine is refluxed for 32 hours in 120 ml. of dry pyridine; the solvent is distilled off and the residue taken up in dry ether, filtered, the filtrate saturated with dry HCl gas, and the mixture allowed to stand for 3 hours at 0°. The thus-separated crystals are vacuum filtered; in this way, 1-p-aminobenzoyl-3(5)-[2-(N'-m-tolylpiperazino)-ethyl]-5(3)-methylpyrazole hydrochloride is obtained, softening starting with 200°.

EXAMPLE 7

Analogously to Example 2, with the use of the following starting compounds:

3-[2-(N'-phenylpiperazino)-ethyl]-5-methylpyrazole

3-[2-(N'-o-tolylpiperazino)-ethyl]-5-methylpyrazole

3-[2-(N'-m-tolylpiperazino)-ethyl]-5-methylpyrazole

3-[2-(N'-p-tolylpiperazino)-ethyl]-5-methylpyrazole

3-[2-(N'-o-ethylphenylpiperazino)-ethyl]-5-methylpyrazole

3-[2-(N'-m-ethylphenylpiperazino)-ethyl]-5-methylpyrazole

3-[2-(N'-p-ethylphenylpiperazino)-ethyl]-5-methylpyrazole

3-[2-(N'-o-isopropylphenylpiperazino)-ethyl]-5-methylpyrazole

3-[2-(N'-m-isopropylphenylpiperazino)-ethyl]-5-methylpyrazole

3-[2-(N'-p-isopropylphenylpiperazino)-ethyl]-5-methylpyrazole

3-[2-(N'-m-tert.-butylphenylpiperazino)-ethyl]-5-methylpyrazole

3-[2-(N'-p-tert.-butylphenylpiperazino)-ethyl]-5-methylpyrazole

3-[2-(N'-o-fluorophenylpiperazino)-ethyl]-5-methylpyrazole

3-[2-(N'-m-fluorophenylpiperazino)-ethyl]-5-methylpyrazole

3-[2-(N'-p-fluorophenylpiperazino)-ethyl]-5-methylpyrazole

3-[2-(N'-o-chlorophenylpiperazino)-ethyl]-5-methylpyrazole

3-[2-(N'-p-chlorophenylpiperazio)-ethyl]-5-methylpyrazole

3-[2-(N'-o-bromophenylpiperazino)-ethyl]-5-methylpyrazole

3-[2-(N'-m-bromophenylpiperazino)-ethyl]-5-methylpyrazole

3-[2-(N'-p-bromophenylpiperazino)-ethyl]-5-methylpyrazole

3-[2-(N'-o-iodophenylpiperazino)-ethyl]-5-methylpyrazole

3-[2-(N'-m-iodophenylpiperazino)-ethyl]-5-methylpyrazole

3-[2-(N'-p-iodophenylpiperazino)-ethyl]-5-methylpyrazole

3-[2-(N'-o-methoxyphenylpiperazino)-ethyl]-5-methylpyrazole

3-[2-(N'-m-methoxyphenylpiperazino)-ethyl]-5-methylpyrazole

3-[2-(N'-p-methoxyphenylpiperazino)-ethyl]-5-methylpyrazole

3-[2-(N'-o-ethoxyphenylpiperazino)-ethyl]-5-methylpyrazole

3-[2-(N'-m-ethoxyphenylpiperazino)-ethyl]-5-methylpyrazole

3-[2-(N'-p-ethoxyphenylpiperazino)-ethyl]-5-methylpyrazole

3-[2-(N'-o-trifluoromethylphenylpiperazino)-ethyl]-5-methylpyrazole

3-[2-(N'-m-trifluoromethylphenylpiperazino)-ethyl]-5-methylpyrazole

3-[2-(N'-p-trifluoromethylphenylpiperazino)-ethyl]-5-methylpyrazole

3-{2-[N'-(2,4-dimethoxyphenyl)-piperazino]-ethyl}-5-methylpyrazole

3-{2-[N'-(3,4-dimethoxyphenyl)-piperazino]-ethyl}-5-methylpyrazole

3-{2-[N'-(3,4,5-trimethoxyphenyl)-piperazino]-ethyl}-5-methylpyrazole, the following products are obtained by reaction with acetyl chloride:

1-acetyl-3(5)-[2-(N'-phenylpiperazino)-ethyl]-5(3)-methylpyrazole 1-acetyl-3(5)-[2-(N'-o-tolylpiperazino)-ethyl]-5(3)-methylpyrazole 1-acetyl-3(5)-[2-(N'-m-tolylpiperazino)-ethyl]-5(3)-methylpyrazole 1-acetyl-3(5)-[2-(N'-p-tolylpiperazino)-ethyl]-5(3)-methylpyrazole 1-acetyl-3(5)-[2-(N'-o-ethylphenylpiperazino)-ethyl]-5(3)-methylpyrazole 1-acetyl-3(5)-[2-(N'-m-ethylphenylpiperazino)-ethyl]-5(3)-methylpyrazole 1-acetyl-3(5)-[2-(N'-p-ethylphenylpiperazino)-ethyl]-5(3)-methylpyrazole 1-acetyl-3(5)-[2-(N'-o-isopropylphenylpiperazino)-ethyl]5(3)-methylpyrazole 1-acetyl-3(5)-[2-(N'-m-isopropylphenylpiperazino)-ethyl]-5(3)-methylpyrazole 1-acetyl-3(5)-[2-(N'-p-isopropylphenylpiperazino)-ethyl]-5(3)-methylpyrazole 1-ace-3(5)-[2-(N'-m-tert.-butylphenylpiperazino)-ethyl]-5(3)-methylpyrazole
1-acetyl-3(5)-[2-(N'-p-tert.-butylphenylpiperazino)-ethyl]-5(3)-methylpyrazole
1-acetyl-3(5)-[2-(N'-o-fluorophenylpiperazino)-ethyl]-5(3)-methylpyrazole
1-acetyl-3(5)-[2-(N'-m-fluorophenylpiperazino)-ethyl]-5(3)-methylpyrazole
1-acetyl-3(5)-[2-(N'-m-fluorophenylpiperazino)-ethyl]-5(3)-methyl-pyrazole
1-acetyl-3(5)-[2-(N'-o-chlorophenylpiperazino)-ethyl]-5(3)-methyl-pyrazole
1-acetyl-3(5)-[2-(N'-p-chlorophenylpiperazino)-ethyl]-5(3)-methylpyrazole
1-acetyl-3(5)-[2-(N'-o-bromophenylpiperazino)-ethyl]-5(3)-methylpyrazole
1-acetyl-3(5)-[2-(N'-m-bromophenylpiperazino)-ethyl]-5(3)-methylpyrazole
1-acetyl-3(5)-[2-(N'-p-bromophenylpiperazion)-ethyl]-5(3)-methylpyrazole
1-acetyl-3(5)-[2-(N'-o-iodophenylpiperazino)-ethyl]-5(3)-methylpyrazole
1-acetyl-3(5)-[2-(N'-m-iodophenylpiperazino)-ethyl]-5(3)-methylpyrazole
1-acetyl-3(5)-[2-(N'-p-iodophenylpiperazino)-ethyl]-5(3)-methylpyrazole
1-acetyl-3(5)-[2-(N'-o-methoxyphenylpiperazino)-ethyl]5(3)-methylpyrazole
1-acetyl-3(5)-[2-(N'-m-methoxyphenylpiperazino)-ethyl]-5(3)-methylpyrazole
1-acetyl-3(5)-[2-(N'-p-methoxyphenylpiperazino)-ethyl]-5(3)-methylpyrazole
1-acetyl-3(5)-[2-(N'-o-ethoxyphenylpiperazino)-ethyl]-5(3)-methylpyrazole
1-acetyl-3(5)-[2-(N'-m-ethoxyphenylpiperazino)-ethyl]-5(3)-methylpyrazole
1-acetyl-3(5)-[2-(N'-p-ethoxyphenylpiperazino)-ethyl]-5(3)-methylpyrazole
1-acetyl-3(5)-[2-(N'-o-trifluoromethylphenylpiperazino)-ethyl]-5(3)-methylpyrazole
1-acetyl-3(5)-[2-(N'-m-trifluoromethylphenylpiperazino)-ethyl]-5(3)-methylpyrazole
1-acetyl-3(5)-[2-(N'-p-trifluoromethylphenylpiperazino)-ethyl]-5(3)-methylpyrazole
1-acetyl-3(5)-{2-[N'-(2,4-dimethoxyphenyl)-piperazino]-ethyl}-5(3)-methylpyrazole
1-acetyl-3(5)-{2-[N'-(3,4-dimethoxyphenyl)-piperazino]-ethyl}-5(3)-methylpyrazole
1-acetyl-3(5)-{2-[N'-(3,4,5-trimethoxyphenyl)-piperazino]-ethyl}-5(3)-methylpyrazole.

EXAMPLE 8

Analogously to Example 2, by using the following starting substances:
3-[(N'-m-tolylpiperazino)-methyl]-5-methylpyrazole
3-[(N'-m-chlorophenylpiperazino)-methyl]-5-methylpyrazole
3-[2-(N'-m-tolylpiperazino)-ethyl]-5-methylpyrazole
3-[3-(N'-m-tolylpiperazino)-propyl]-5-methylpyrazole
3-[3-(N'-m-chlorophenylpiperazino)-propyl]-5-methylpyrazole
3-[4-(N'-m-tolylpiperazino)-butyl]-5-methylpyrazole
3-[4-(N'-m-chlorophenylpiperazino)-butyl]-5-methylpyrazole the compounds set forth below are obtained by reaction with acetyl chloride:

1-acetyl-3(5)-[(N'-m-tolylpiperazino)-methyl]-5(3)-methylpyrazole
1-acetyl-3(5)-[(N'-m-chlorophenylpiperazino)-methyl]-5(3)-methylpyrazole
1-acetyl-3(5)-[2-(N'-m-tolylpiperazino)-ethyl]-5(3)-methylpyrazole
1-acetyl-3(5)-[3-(N'-m-tolylpiperazino)-propyl]-5(3)-methylpyrazole
1-acetyl-3(5)-[3-(N'-m-chlorophenylpiperazino)-propyl]-5(3)-methylpyrazole
1-acetyl-3(5)-[4-(N'-m-tolylpiperazino)-butyl]-5(3)-methylpyrazole
1-acetyl-3(5)-[4-(N'-m-chlorophenylpiperazino)-butyl]-5(3)-methylpyrazole.

EXAMPLE 9

In analogy to Example 2, with the use of the chlorides or bromides of the following:

propionic acid
butyric acid
isobutyric acid
valeric acid
isovaleric acid
pivalic acid
caproic acid
isocaproic acid
diethylacetic acid
heptanoic acid
octanoic acid
nonanoic acid
decanoic acid
undecanoic acid
acrylic acid
propiolic acid
chloroformic acid ethyl ester
phenylacetic acid
2-phenylpropionic acid
3-phenylpropionic acid
2-phenylbutyric acid
3-phenylbutyric acid
4-phenylbutyric acid cinnamic acid
phenylpropiolic acid
benzoic acid
o-methylbenzoic acid
m-methylbenzoic acid
p-methylbenzoic acid
2,4-dimethylbenzoic acid
o-methoxybenzoic acid
m-methoxybenzoic acid
p-methoxybenzoic acid
2,4-dimethoxybenzoic acid
3,4-dimethoxybenzoic acid
3,4,5-trimethoxybenzoic acid
o-aminobenzoic acid
m-aminobenzoic acid
p-aminobenzoic acid
p-dimethylaminobenzoic acid
p-diethylaminobenzoic acid
1-naphthalenecarboxylic acid
2-naphthalenecarboxylic acid, the compounds set forth hereinbelow are obtained by reaction with 3(5)-[(N'-m-chlorophenylpiperazino)-ethyl]-5(3)-methylpyrazole:

1-propionyl-3(5)-[2-(N'-m-chlorophenylpiperazino)-ethyl]-5(3)-methylpyrazole,
1-butyryl-3(5)-[2-(N'-m-chlorophenylpiperazino)-ethyl]-5(3)-methylpyrazole; picrate, m.p. 132°–134°,
1-isobutyryl-3(5)-[2-(N'-m-chlorophenylpiperazino)-ethyl]-5(3)-methylpyrazole,
1-valeryl-3(5)-[2-(N'-m-chlorophenylpiperazino)-ethyl]-5(3)-methylpyrazole,
1-isovaleryl-3(5)-[2-(N'-m-chlorophenylpiperazino)-ethyl]-5(3)-methylpyrazole, 1-pivaloyl-3(5)-[2-(N'-m-chlorophenylpiperazino)-ethyl]-5(3)-methylpyrazole,
1-caproyl-3(5)-[2-(N'-m-chlorophenylpiperazino)-ethyl]-5(3)-methylpyrazole,
1-isocaproyl-3(5)-[2-(N'-m-Chlorophenylpiperazino)-ethyl-5(3)-methylpyrazole,
1-diethylacetyl-3(5)-[2-(N'-m-chlorophenylpiperazino)-ethyl]-5(3)-methylpyrazole,
1-heptanoyl-3(5)-[2-(N'-m-chlorophenylpiperazino)-ethyl]-5(3)-methylpyrazole,
1-octanoyl-3(5)-[2-(N'-m-chlorophenylpiperazino)-ethyl]-5(3)-methylpyrazole,
1-nonanoyl-3(5)-[2-(N'-m-chlorophenylpiperazino)-ethyl]-5(3)-methylpyrazole, oil, NMR signals at ($\delta$ in p.p.m.): 1.22–1.35; 1.50–1.82; 2.19; 2.49–2.71; 2.97–3.19; 5.94; 5.98; 6.64–6.82; 6.99; 7.07; 7.15; 7.23;
1-decanoyl-3(5)-[2-(N'-m-chlorophenylpiperazino)-ethyl]-5(3)-methylpyrazole,
1-undecanoyl-3(5)-[2-(N'-m-chlorophenylpiperazino)-ethyl]-5(3)-methylpyrazole,
1-acryloyl-3(5)-[2-(N'-m-chlorophenylpiperazino)-ethyl]-5(3)-methylpyrazole,
1-propioloyl-3(5)-[2-(N'-m-chlorophenylpiperazino)-ethyl]-5(3)-methylpyrazole,
1-ethoxycarbonyl-3(5)-[2-(N'-m-chlorophenylpiperazino)-ethyl]-5(3)-methylpyrazole; dihydrochloride monohydrate, m.p. 150°–152°,
1-phenylacetyl-3(5)-[2-(N'-m-chlorophenylpiperazino)-ethyl]-5(3)-methylpyrazole,
1-(2-phenylpropionyl)-3(5)-[2-(N'-m-chlorophenylpiperazino)-ethyl]-5(3)-methylpyrazole,
1-(3-phenylpropionyl)-3(5)-[2-(N'-m-chlorophenylpiperazino)-ethyl]-5(3)-methylpyrazole,
1-(2-phenylbutyryl)-3(5)-[2-(N'-m-chlorophenylpiperazino)-ethyl]-5(3)-methylpyrazole,
1-(3-phenylbutyryl)-3(5)-[2-(N'-m-chlorophenylpiperazino)-ethyl]-5(3)-methylpyrazole,
1-(4-phenylbutyryl)-3(5)-[2-(N'-m-chlorophenylpiperazino)-ethyl]-5(3)-methylpyrazole,
1-cinnamoyl-3(5)-[2-(N'-m-chlorophenylpiperazino)-ethyl]-5(3)-methylpyrazole; hydrochloride, m.p. 225°–227°,
1-phenylpropioloyl-3(5)-[2-(N'-m-chlorophenylpiperazino)-ethyl]-5(3)-methylpyrazole,
1-benzoyl-3(5)-[2-(N'-m-chlorophenylpiperazino)-ethyl]-5(3)-methylpyrazole; hydrochloride, m.p. 228°–230°,
1-o-methylbenzoyl-3(5)-[2-(N'-m-chlorophenylpiperazino)-ethyl]-5(3)-methylpyrazole,
1-m-methylbenzoyl-3(5)-[2-(N'-m-chlorophenylpiperazino)-ethyl]-5(3)-methylpyrazole,
1-p-methylbenzoyl-3(5)-[2-(N'-m-chlorophenylpiperazino)-ethyl]-5(3)-methylpyrazole,
1-(2,4-dimethylbenzoyl)-3(5)-[2-(N'-m-chlorophenylpiperazino)-ethyl]-5(3)-methylpyrazole,
1-o-methoxybenzoyl-3(5)-[2-(N'-m-chlorophenylpiperazino)-ethyl]-5(3)-methylpyrazole,
1-m-methoxybenzoyl-3(5)-[2-(N'-m-chlorophenylpiperazino)-ethyl]-5(3)-methylpyrazole,
1-p-methoxybenzoyl-3(5)-[2-(N'-m-chlorophenylpiperazino)-ethyl]-5(3)-methylpyrazole,
1-(2,4-dimethoxybenzoyl)-3(5)-[2-(N'-m-chlorophenylpiperazino)-ethyl]-5(3)-methylpyrazole,
1-(3,4-dimethoxybenzyl)-3(5)-[2-(N'-m-chlorophenylpiperazino)-ethyl]-5(3)-methylpyrazole,
1-(3,4,5-trimethoxybenzoyl)-3(5)-[2-(N'-m-chlorophenylpiperazino)-ethyl]-5(3)-methylpyrazole, oil, NMR signals at ($\delta$ in p.p.m.): 2.24; 2.26; 2.60-2.80; 3.12–3.26; 3.84; 3.86; 3.89; 6.08; 6.12; 6.56–6.69; 7.00–7.39,
1-o-aminobenzoyl-3(5)-[2-(N'-m-chlorophenylpiperazino)-ethyl]-5(3)-methylpyrazole,
1-m-aminobenzoyl-3(5)-[2-(N'-m-chlorophenylpiperazino)-ethyl]-5(3)-methylpyrazole,
1-p-aminobenzoyl-3(5)-[2-(N'-m-chlorophenylpiperazino)-ethyl]-5(3)-methylpyrazole, hydrochloride · ½ H$_2$O, softening at 200°;
1-p-dimethylaminobenzoyl-3(5)-[2-(N'-m-chlorophenylpiperazino)-ethyl]-5(3)-methylpyrazole,
1-p-diethylaminobenzoyl-3(5)-[2-(N'-m-chlorophenylpiperazino)-ethyl]-5(3)-methylpyrazole,
1-naphthoyl-(2)-3(5)-[2-(N'-m-chlorophenylpiperazino)-ethyl]-5(3)-methylpyrazole,
1-naphthoyl-(3)-3(5)-[2-(N'-m-chlorophenylpiperazino)-ethyl]-5(3)-methylpyrazole.

EXAMPLE 10

Analogously to Example 4, the corresponding 1-acyl-3(5)-[2-(N'-m-tolylpiperazino)-ethyl]-5-methylpyrazoles are obtained by reaction with the anhydrides of the acids set forth in Example 9.

EXAMPLE 11

At −25° C., 5.6 g. of 3-[2-(N'-m-tolylpiperazino)-ethyl]-5-methylpyrazole, dissolved in 40 ml. of absolute tetrahydrofuran, is added to a solution of butyrylethyl carbonate in absolute tetrahydrofuran (produced from a mixture of 1.8 g. of butyric acid, 1.5 g. of dry diethylamine, and 40 ml. of absolute tetrahydrofuran by the addition of 2.2 g. of ethyl chloroformate at −25° C.). The reaction mixture is allowed to stand at room temperature for 6 hours, filtered, washed with tetrahydrofuran, the filtrate is evaporated under vacuum, taken up in ether, washed with dilute H$_2$SO$_4$, aqueous 5% Na$_2$CO$_3$ solution, and water, dried over Na$_2$SO$_4$, and the ether is distilled off. The product thus obtained in 1-butyryl-3(5)-[2-(N'-m-tolylpiperazino)-ethyl]-5(3)-methylpyrazole; picrate, m.p. 200°–202°.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A member of the group consisting of a compound of the formula

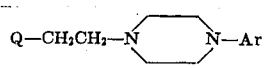

wherein Ar is phenyl or phenyl mono-, di or tri- substituted by methyl, ethyl, isopropyl, methoxy, ethoxy, halogen, or mono-substituted by trifluoromethyl, and Q is

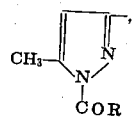

the corresponding compound wherein Q is

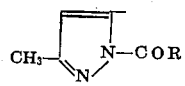

wherein R in both occurrences is alkyl or phenylalkyl of up to 10 carbon atoms, phenyl, naphthyl or phenyl mono-, di- or tri- substituted by alkyl or methoxy or mono-substituted by amino, alkylamino or dialkylamino, alkyl in each instance being of one to three carbon atoms, a mixture of the two compounds, and the physiologically acceptable acid addition salts thereof.

2. A compound of claim 1 wherein R is alkyl of up to 10 carbon atoms.

3. A compound of claim 1 wherein Ar is phenyl or phenyl substituted by halo or alkyl of one to three carbon atoms.

4. The compound of claim 3, 1-acetyl-3-[2-(N'-m-chlorophenylpiperazino)-ethyl]-5-methylpyrazole.

5. The compound of claim 3, 1-acetyl-5-[2-(N'-m-chlorophenylpiperazino)-ethyl]-3-methylpyrazole.

6. The compound of claim 3, 1-butyryl-3-[2-(N'-m-chlorophenylpiperazino)-ethyl]-5-methylpyrazole.

7. The compound of claim 3, 1-butyryl-5-[2-(N'-m-chlorophenylpiperazino)-ethyl]-3-methylpyrazole.

8. The compound of claim 2, 1-butyryl-3-[2-(N'-m-tolylpiperazino)-ethyl]-5-methylpyrazole.

9. The compound of claim 2, 1-butyryl-5-[2-(N'-m-tolylpiperazino)-ethyl]-3-methylpyrazole.

10. The compound of claim 3, 1-nonanoyl-3-[2-(N'-m-chlorophenylpiperazino)-ethyl]-5-methylpyrazole.

11. The compound of claim 3, 1-nonanoyl-5-[2-(N'-m-chlorophenylpiperazino)-ethyl]-3-methylpyrazole.

12. The compound of claim 3, 1-benzoyl-3-[2-(N'-m-chlorophenylpiperazino)-ehtyl]-5-methylpyrazole.

13. The compound of claim 3, 1-benzoyl-5-[2-(N'-m-chlorophenylpiperazino)-ethyl]-3-methylpyrazole.

14. The compound of claim 3, 1-p-aminobenzoyl-3-[2-(N'-m-chlorophenylpiperazino)-ethyl]-5 -methylpyrazole.

15. The compound of claim 3, 1-p-aminobenzoyl-5-[2-(N'-m-chlorophenylpiperazino)-ethyl]-3-methylpyrazole.

16. The compound of claim 3, 1-(3,4,5-trimethoxybenzoyl)-3-[2-(N'-m-chlorophenylpiperazino)-ethyl]-5-methylpyrazole.

17. The compound of claim 3, 1-(3,4,5-trimethoxybenzoyl)-5-[2-(N'-m-chlorophenylpiperazino)-ethyl]-3-methylpyrazole.

* * * * *